United States Patent
Mock et al.

Patent Number: 5,382,949
Date of Patent: Jan. 17, 1995

[54] METHOD FOR INCREASING BATTERY LIFE FOR SELECTIVE CALL RECEIVERS

[75] Inventors: Von A. Mock, Lantana; Eric T. Eaton, Lake Worth, both of Fla.

[73] Assignee: Motorola, Inc., Schaumburg, Ill.

[21] Appl. No.: 11,614

[22] Filed: Feb. 1, 1993

[51] Int. Cl.⁶ .......................... H04Q 7/00; H04B 7/00
[52] U.S. Cl. ................. 340/825.44; 455/38.3; 455/343
[58] Field of Search ............. 340/825.44; 379/59; 455/33.1, 38.3, 343

[56] References Cited

U.S. PATENT DOCUMENTS

| | | | |
|---|---|---|---|
| 4,437,095 | 3/1984 | Akahori et al. | 340/825.44 |
| 4,449,248 | 5/1984 | Leslie et al. | 455/38.3 |
| 4,642,632 | 2/1987 | Ohyagi et al. | 340/825.44 |
| 4,713,808 | 12/1987 | Gaskell et al. | 340/825.44 |
| 4,769,642 | 9/1988 | Davis et al. | 340/825.44 |
| 4,816,820 | 3/1989 | Davis | 340/825.44 |
| 4,839,641 | 6/1989 | Mori et al. | 340/825.47 |

Primary Examiner—Donald J. Yusko
Assistant Examiner—Edward Merz
Attorney, Agent, or Firm—Keith A. Chanroo; John H. Moore

[57] ABSTRACT

A selective call receiver system (150, 200) includes a base site (150) which transmits paging information (100) having a plurality of batches (1-to-N). The base site (150) comprises timer (266) for calculating a time between a first of the at least two successive paging transmissions, and counter (266) for counting a number of batches to be transmitted in the at least two successive paging transmissions. A base site processor (254), coupled to the timer/counter (266), processes the paging information. The base site processor (254) comprises encoder (262) for encoding a portion of the first of the at least two successive paging transmissions with the calculated time and the number batches to be transmitted in the first paging transmission. A base site transmitter (252), coupled to the base site processor (254), transmits the at least two successive paging transmissions according to the calculated time to a plurality of selective call receivers (200). The selective call receiver (200) comprises a receiver (204) for receiving the paging transmissions. Decoder (206), coupled to the receiver (204)s, for decoding the number of batches (1-to-N) being transmitted therein and the time to a next paging transmission. Power switch (210), coupled the decoder, for disabling and enabling a power supply to the receiver (204) for receiving an assigned frame (F0-F7) of the plurality of batches (1-to-N). The power switch (210), being further responsive to the plurality of batches being decoded, disables and enables the power supply to the receiver for receiving successive paging transmissions.

20 Claims, 4 Drawing Sheets

METHOD FOR INCREASING BATTERY LIFE FOR SELECTIVE CALL RECEIVERS

FIELD OF THE INVENTION

This invention relates in general to selective call receivers, and more specifically to a method for increasing battery-life for selective call receivers.

BACKGROUND OF THE INVENTION

With the reduction of the size of selective call receivers and the need for portableness and convenience, selective call receivers have primarily depended upon battery power supplied by limited energy content batteries. Thus, users desire power conserving methods in the selective call receivers for improving their battery life. One of the primary current draining circuits in a selective call receiver is the receiver circuitry. The receiver circuitry must be energized to allow the selective call receiver to receive radio frequency (RF) signals intended for reception by the selective call receiver, however, the receiver circuitry can be de-energized during other operations of the selective call receiver.

An example of a conventional power conserving method involves determining whether the carrier frequency indicates transmissions intended for the selective call receiver are being received. It can be quickly determined whether a carrier frequency is received, but a selective call receiver system may broadcast numerous types of information on the carrier frequency, some of which are not intended for the selective call receiver which may cause an unknowing receiver to expend battery power unnecessarily.

Also, selective call receivers can improve their battery life by having the receiver circuitry energized only during portions the signaling protocol to be received. Typically, battery saving methods require that the selective call receiver knows when addresses are transmitted within the signaling protocol. For example, conventional battery saving methods take advantage of frame assignments and the occurrences of addresses at predetermined positions within the signaling protocol, for example the Post Office Code Standardization Advisory Group (POCSAG) signaling protocol, by de-energizing the receiver circuitry during the portions of the signaling protocol when the address of the selective call receiver is not being transmitted. According to the POCSAG signaling protocol, before detection of its address, the selective call receiver detects preamble and the synchronization codeword which enables the selective call receiver to achieve synchronization to the paging transmission.

However, selective call receivers, when receiving paging transmissions, do not know the exact time when the current paging transmission will end and when the next transmission will begin. Therefore, because the selective call receiver is ignorant of the beginning and ending of each transmission, the receiver circuitry is energized for an unnecessarily long time to decode information until the selective call receiver has determined that the current transmission has ended and a new transmission has began.

Thus, what is needed is a battery saving method for increasing the period of time the receiver circuitry is de-energized by determining the beginnings and endings of paging transmissions being received.

SUMMARY OF THE INVENTION

A selective call receiver system includes a base site which transmits paging information having a plurality of batches. The base site comprises means for calculating a time between at least two successive paging transmissions, and means for counting a number of batches to be transmitted in the first of the at least two successive paging transmissions. A base site processing means, coupled to the calculating means and the counting means, processes the paging information. The base site processing means comprises means for encoding a portion of at least a first of the at least two successive paging transmissions with the calculated time and the number batches to be transmitted in the first paging transmission. A base site transmitting means, coupled to the base site processing means, transmits the at least two successive paging transmissions according to the calculated time to a plurality of selective call receivers. The selective call receivers comprises means for receiving the paging transmissions. Means, coupled to the receiving means, for decoding the number of batches being transmitted therein and the time to a next paging transmission. Means, coupled the decoding means, for disabling and enabling a power supply to the receiving means for receiving an assigned frame of the plurality of batches. The disabling and enabling means, being further responsive to the plurality of batches being decoded, disables and enables the power supply to the receiving means for receiving successive paging transmissions.

In a selective call receiver system including a base site capable of transmitting paging information having a plurality of batches, a method comprising the steps of:
(a) calculating a time between at least two successive paging transmissions;
(b) counting a number of batches to be transmitted in a first of the at least two successive paging transmissions;
(c) processing the paging information, said step of processing further comprising the steps of:
(d) encoding a portion of at least a first of the at least two successive paging transmissions with the calculated time and the number batches to be transmitted in the first paging transmission; and
(e) transmitting the at least two successive paging transmissions according to the calculated time to a plurality of selective call receivers; said selective call receiver further comprising the steps of:
(f) receiving the paging transmissions;
(g) decoding the number of batches being transmitted therein and the time to a next paging transmission; and
(h) disabling and enabling a power supply to said receiving means for receiving an assigned frame of the plurality of batches wherein said step of disabling and enabling enables and disables the power supply for receiving successive paging transmissions.

DESCRIPTION OF A PREFERRED EMBODIMENT

Figure 1:
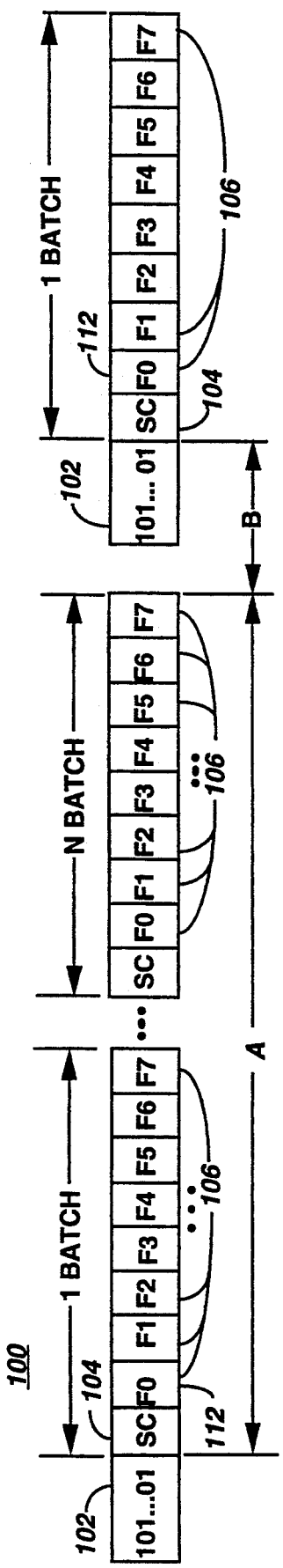
FIGS. 1-3 are signaling diagrams of the POCSAG protocol signal encoded in accordance with the preferred embodiment of the present invention.

Referring to FIG. 1, a signaling diagram of the Post Office Code Standardization Advisory Group (POCSAG) protocol signal as utilized in the preferred embodiment of the present invention is shown. The POCSAG signaling protocol 100 comprises a series of addresses and/or message information identified as batches which are intended for individual selective call receiver or groups of selective call receivers assigned to a paging system. The series of addresses are assembled in accordance with requests and transmitted as a continuous transmission. The transmission is of a digital format and starts with a preamble 102 of at least 576 bits of alternating "ones" and "zeros", equivalent to the duration of a batch and one additional codeword. The preamble 102 is followed by one or more batches of addresses and message codewords. Each batch begins with a synchronization codeword (SC) 104 followed by eight frames (F0–F7) 106. The paging transmitter, during its transmissions, transmits a plurality of batches (1-to-N) for a period of A seconds, the number of batches being dependent upon the amount of address/message information to be transmitted. After the first transmission of the N-batches of address/information in A units of time, a new transmission begins at some time (B) after the end the first transmission depending on message inputs. The second transmission similarly begins with a preamble 102, and at least one batch, each batch beginning with a synchronization codeword 104. Accordingly, the selective call receiver assigned to the paging system will not know how many batches of address/information are being transmitted, and will not know when current transmission will end and when a new transmission will begin. Therefore, the selective call receiver will energize its receiver circuitry until the selective call receiver determine that the current transmission has ended and a new transmission has began.

Figure 2:
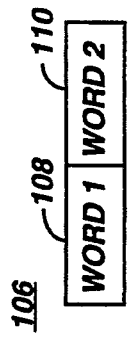
Figure 3:
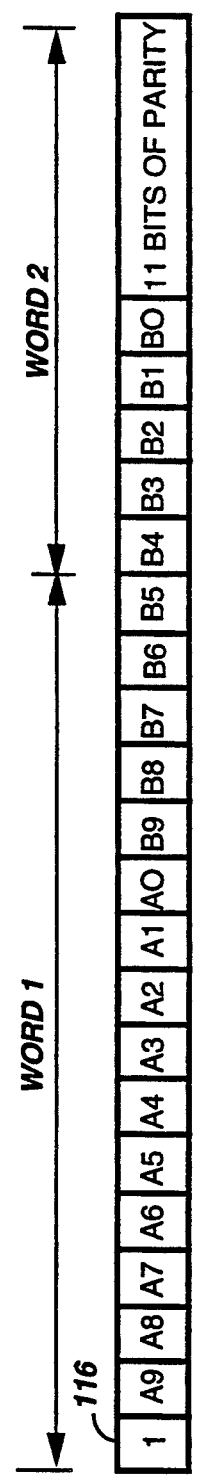

FIG. 2 shows a timing diagram of frames 106, each frame 106 of the batches (1-to-N) has a duration equivalent to two codewords (WORD1, WORD2) 108, 110, namely address codewords and/or message codewords. FIG. 3 shows a more detailed timing diagram of the first frame (F0) 112 of the first batch of each transmission in accordance with the preferred embodiment of the present invention. Specifically, the first frame 112 similarly comprises two codewords 108, 110. Each codeword comprises thirty-two bits. The first bit 116 of frame 112 is encoded with either a binary "one" or "zero". The binary "one" indicates that the following data is message data and the binary "zero" indicates that the following data is address data. After transmitting preamble 102 and the first synchronization codeword 104 (FIG. 1), the paging transmitter transmits, in the first frame (F0) 112, variable system information. The variable system information uses the binary "one" at the beginning of the first frame 112 to indicate that the following data is the variable system information. The variable system information contains, in units of batch times rounded to the lowest integer, the number of batches in the current transmission A9–A0 and the amount of time from the end of the current transmission to the first bit of the first synchronization codeword 104 of the next transmission B9–B0. Accordingly, the selective call receiver can calculate the time from the end of one transmission to the beginning of another transmission from the data received in the variable system information. Upon decoding the variable system information, the selective call receivers know precisely the time to the first bit of the first synchronization codeword of the next transmission. In this way, selective call receivers, upon decoding the variable system information, operate in a super battery save mode for the amount of time calculated. Specifically, because the selective call receivers know the number batches in a transmission and the time to the next transmission, the selective call receivers do not need to continue decoding, as is normally done, after the paging transmitter has stopped transmitting to be able to determine when the next transmission has started.

Figure 4:
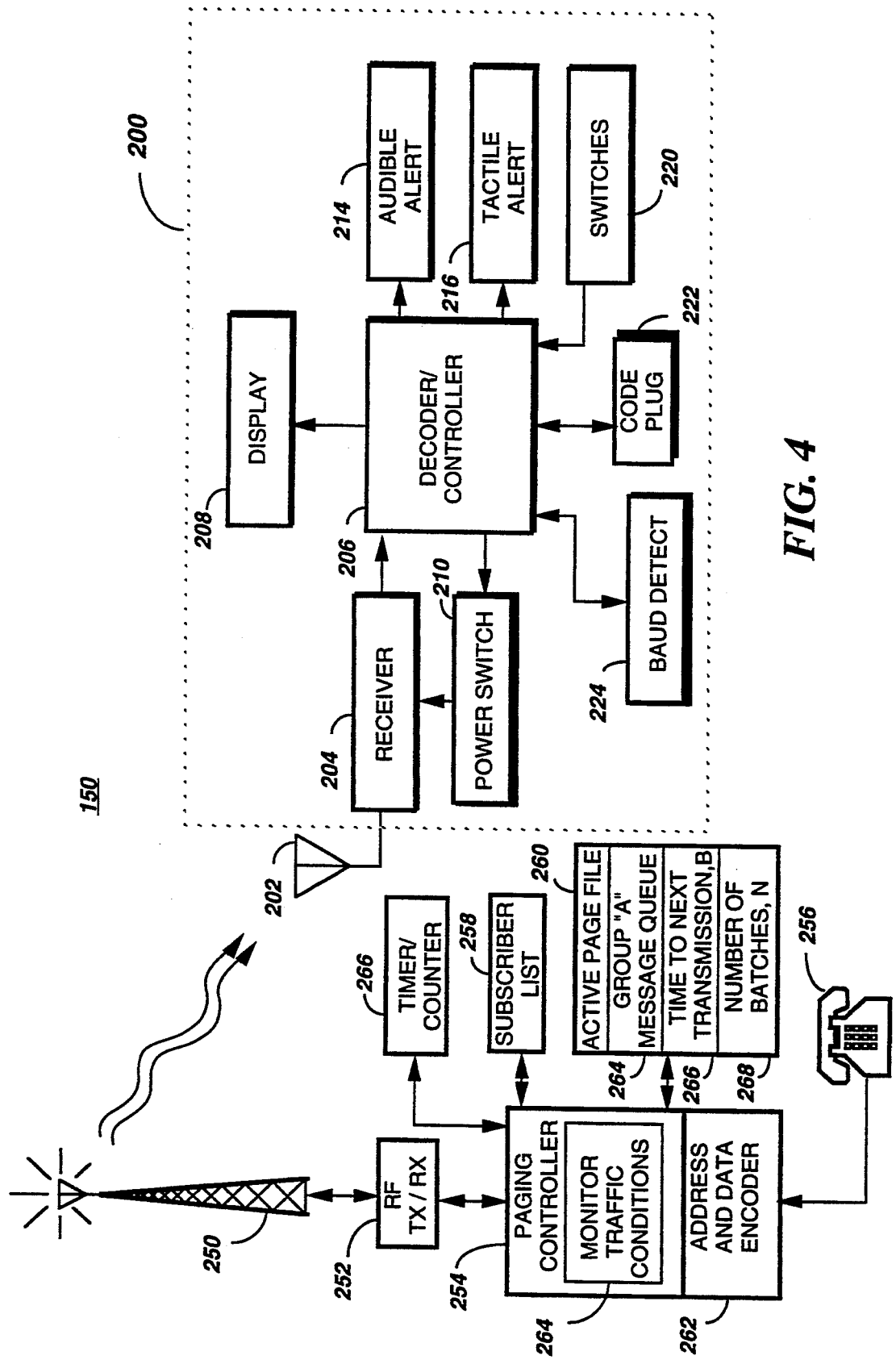
FIG. 4 is an electrical block diagram of a paging system illustrating a paging transmitter and a selective call receiver in accordance with the preferred embodiment of the present information.

FIG. 4 is an electrical block diagram of a paging system 150 illustrating a paging transmitter and a selective call receiver 200 in accordance with the preferred embodiment of the present invention. The paging transmitter is coupled to an input device, for example a telephone 256 for inputting messages or initiating pages via a paging controller 254. The paging controller 254 generates, inter alia, the pages to be transmitted to respective selective call receivers 200 according to, for example, the POCSAG signaling protocol. An active page file memory 260 couples to the paging controller 254 for providing temporary storage queues for messages awaiting transmission. The active page file memory 260 generally provides volatile information storage utilizing such volatile memory devices as semiconductor random access memories (RAMs) and non-volatile information storage such as hard disk drives. The active page file memory 260 is partitioned into message queues 264 to provide message storage for paging receivers operating in different battery saver groups. The paging controller 254 calculates and stores in a partition 266 of the active page file memory 260, the time from the end of a first paging transmission to a next paging transmission, the details of which will be discussed further below. Also, the number of batches N to be transmitted in each POCSAG paging transmission is stored in a memory partition 268 of the active page file 260. An address and data encoder 262 are included in the paging controller 254 for encoding into the appropriate signaling protocol the message information recovered from the active page file memory 260. The address and data encoder 262 encodes the messages and addresses of the selective call receivers to be paged according to the POCSAG protocol. A subscriber list memory 258 couples to the paging controller 254 and stores information pertinent to each of the selective call receiver operating within the paging system 150. The subscriber list memory 258 provides non-volatile information storage, using such non-volatile information storage devices as hard and soft disk drives or non-volatile random access memories, such as electrically erasable programmable read-only memories (EEPROMs). The subscriber list memory 258 includes such information as the addresses of the selective call receivers; message type, such as voice, numeric or alphanumeric; address signaling protocol in mixed protocol systems; and battery saving group information.

In addition to encoding the POCSAG protocol paging signal with addresses and message information, the paging controller 254 encodes the first frame 112 of the first batch of each POCSAG paging transmission with the number of batches N to be transmitted in the current paging transmission, and the time B from the last batch of the current paging transmission to the first bit of the first synchronization codeword of a subsequent (next) paging transmission (FIG. 3). The paging controller 254, by the traffic monitor (264) monitors the traffic condition by techniques well known to one of ordinary skill in the art, determines the transmission time of the subsequent paging signal. A timer/counter 266 coupled to the paging controller 254 counts the number of batches to be included in the current paging transmission and measures the time to the next paging transmission. The paging controller 254 which is coupled to the radio frequency transmitter/receiver 252 transmits the pages via an antenna 250. Receiving, processing and transmitting selective call messages is known to one of ordinary skill in the art.

Additionally, the paging transmitter can transmit the paging information at a first baud rate, for example 512 or 1200 bits/seconds, and during the period of time between transmissions of the paging information, and idle signal is transmitted at a second lower baud rate, for example 300 bits/second or 750 bits/second, respectively. Periodic searching, by the selective call receiver, eventually detects the first baud rate of a second paging transmission which indicates that the paging transmitter has began transmitting a second paging transmission.

The transmissions are received by the selective call receiver 200. The selective call receiver 200 comprises an antenna 202 for intercepting transmitted radio frequency (RF) signals which are coupled to the input of a receiver 204. The RF signals are preferably selective call (paging) message signals which provide, for example, a receiver address and an associated message, such as numeric or alphanumeric message. However, it will be appreciated that other well known paging signaling formats, such as tone only signaling or tone and voice signaling, would be suitable for use as well. The receiver 204 processes the RF signal and produces at the output a data stream representative of a demodulated data information. The demodulated data information is coupled into the input of a decoder/controller 206 which processes the information in a manner well known in the art. A baud detector 224, coupled to the controller 206, is used to detect the baud rate of the received paging signal well known to one of ordinary skill in the art. A power switch 210, coupled to the decoder/controller 206, is used to control the supply of power to the receiver 204, thereby providing a battery saving function which will be further discussed in detail below.

For purposes of this illustration, it will be assumed that the POCSAG signaling format is utilized which is well known in the art, although other signaling formats could be utilized as well. When the address is received by the decoder/controller 206, the received address is compared with one or more addresses stored in a code plug (or code memory) 222, and when a match is detected, an alert signal is generated to alert a user that a selective call message, or page, has been received. The alert signal is directed to an audible alerting device 214 for generating an audible alert or to a tactile alerting device 216 for generating a silent vibrating alert. Switches 220 allow the user of the selective call receiver to, among other things, select between the audible alert 214 and the tactile alert 216 in a manner well known in the art.

The message information which is subsequently received is stored in memory 304 (FIG. 5) and can be accessed by the user for display using one or more of the switches 220 which provide such additional functions as reset, read, and delete, etc. Specifically, by the use of appropriate functions provided by the switches 220, the stored message is recovered from memory and processed by the decoder/controller 206 for displaying by a display 208 which enables the user to view the message.

Figure 5:
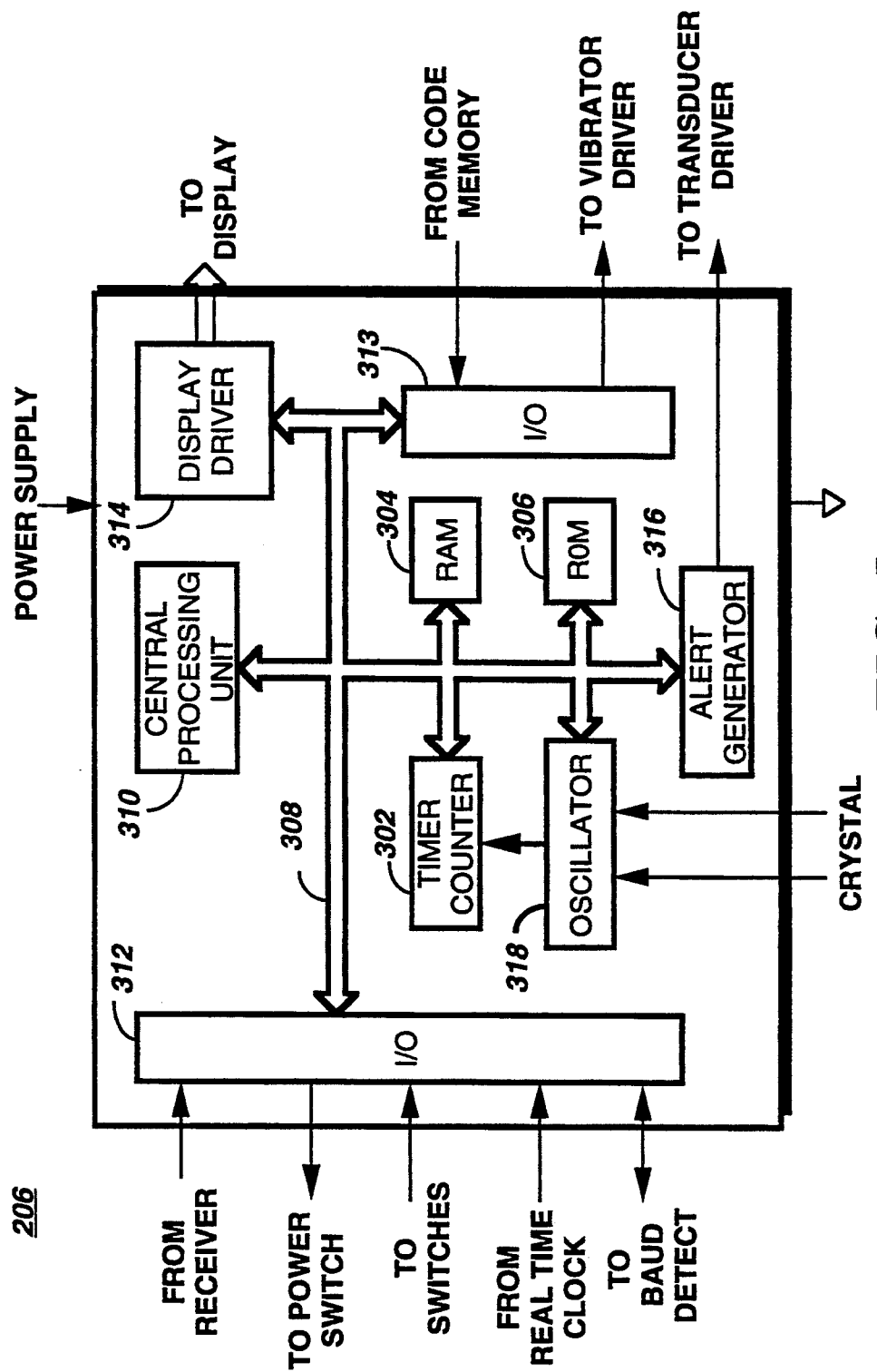
FIG. 5 is an electrical block diagram of a microcomputer based decoder/controller used in the selective call receiver of FIG. 4.

The controller/decoder 206 of FIG. 4 can be implemented utilizing a microcomputer as shown in FIG. 5. FIG. 5 is an electrical block diagram of a microcomputer based decoder/controller suitable for use in the selective call receiver of FIG. 4. As shown, the microcomputer 206 is preferably of the MC68HC05 series microcomputers, such as manufactured by Motorola, Inc., which includes an on-board display driver 314. The microcomputer 206 includes an oscillator 318 which generates the timing signals utilized in the operation of the microcomputer 206. A crystal, or crystal oscillator (not shown) is coupled to the inputs of the oscillator 318 to provide a reference signal for establishing the microcomputer timing. A timer/counter 302 couples to the oscillator 318 and provides programmable timing functions which are utilized in controlling the operation of the receiver or the processor. A RAM (random access memory) 304 is utilized to store variables derived during processing, as well as to provide storage of message information which are received during operation as a selective call receiver. A ROM (read only memory) 306 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 318, timer/counter 302, RAM 304, and ROM 306 are coupled through an address/data/control bus 308 to a central processing unit (CPU) 310 which performs the instructions and controls the operations of the microcomputer 206.

The demodulated data generated by the receiver is coupled into the microcomputer 206 through an input/output (I/O) port 312. The demodulated data is processed by the CPU 310, and when the received address is the same as stored within the code-plug memory which couples into the microcomputer through, for example an I/O port 313, the message, if any, is received and stored in RAM 304. Recovery of the stored message, and selection of the predetermined destination address, is provided by the switches which are coupled to the I/O port 312. The microcomputer 206 then recovers the stored message and directs the information over the data bus 308 to the display driver 314 which processes the information and formats the information for presentation by a display 208 (FIG. 4) such as an LCD (liquid crystal display). At the time a selective call receiver's address is received, the alert signal is generated which can be routed through the data bus 308 to an alert generator 316 that generates the alert enable signal which is coupled to the audible alert device that was described above. Alternatively, when the vibrator alert is selected, as described above, the microcomputer generates an alert enable signal which is coupled through data bus 308 to the I/O port 313 to enable generation of a vibratory, or silent alert.

The battery saver operation is controlled by the CPU 310 with battery saving signals which are directed over the data bus 308 to the I/O port 312 which couples to the power switch 210. Power is periodically supplied to the receiver to enable decoding of the received selective call receiver address signals and any message information which is directed to the selective call receiver. Specifically, when the selective call receiver 200 begins decoding the paging signal, according to the preferred embodiment of the invention, the microcomputer 206 upon decoding the first bit 116 of the first frame 112 of the transmission (FIG. 3) to be a binary "one", decodes the remaining bits of the first frame 112 as message information. The microcomputer then calculates the number of batches N being transmitted in the current transmission and the time to the next transmission B. Therefore, when the selective call receiver 200 receives the N number of batches corresponding to the information received in the first frame 112, the selective call receiver 200 knows that there are no more address/message assigned to it within the current transmission. The microcomputer 206 therefore sends a signal to the power switch 210 to disable power to the receiver 204. The time B derived from the frame 112 is loaded into the timer/counter 302, or any other method well known to one skill in the art, to count-down until it is time to restore power to the receiver 204 (e.g., the arrival of the first bit of the synchronization codeword 104 of the next paging transmission). It can be appreciated that each selective call receiver has a preassigned frame 106 in which the selective call receiver receives its address/message. Therefore, when the selective call receiver 200 has received the N number of frames 106 (one assigned frame in each batch) corresponding to the variable system information decoded in first frame 112, and because the selective call receiver knows where its assigned frame is located in each batch, the selective call receiver can calculate the time from its assigned frame to the end of the Nth batch. According, after receiving the N number of frames, the selective call receiver 200 disables power to the receiver circuitry from the reception of its Nth assigned frame to the time to the end of the current batch plus the time to the first bit of the first synchronization codeword of the next paging transmission B. It can be appreciated by one skilled in the art that the selective call receiver must begin its power-up stage to ensure that the warm-up period is sufficient for receiving paging information.

In this way, a paging system that transmits information relating the number of batches and the time from the last batch to the next paging transmission can extend the battery life of all selective call receivers 200 that are able to decode this information irrespective of which frames are assigned to the selective call receivers. At the end of the time B seconds plus the time from the selective call receiver's assigned frame, a signal is then sent by the microcomputer 206 to the power switch 210 which enables the power to the receiver 206 for receiving the batches transmitted in the second paging transmission. The selective call receiver therefore operates with its normal (first) battery saving mode while receiving information within the preassigned frame of the N batches, however, after the Nth frame of the Nth batch has been received, the selective call receiver battery saves in a super (second) battery saving mode until the first synchronization codeword of the next paging transmission. This super battery saving mode significantly increases the receiver off-time which decreases the current drain on the battery.

Figure 6:
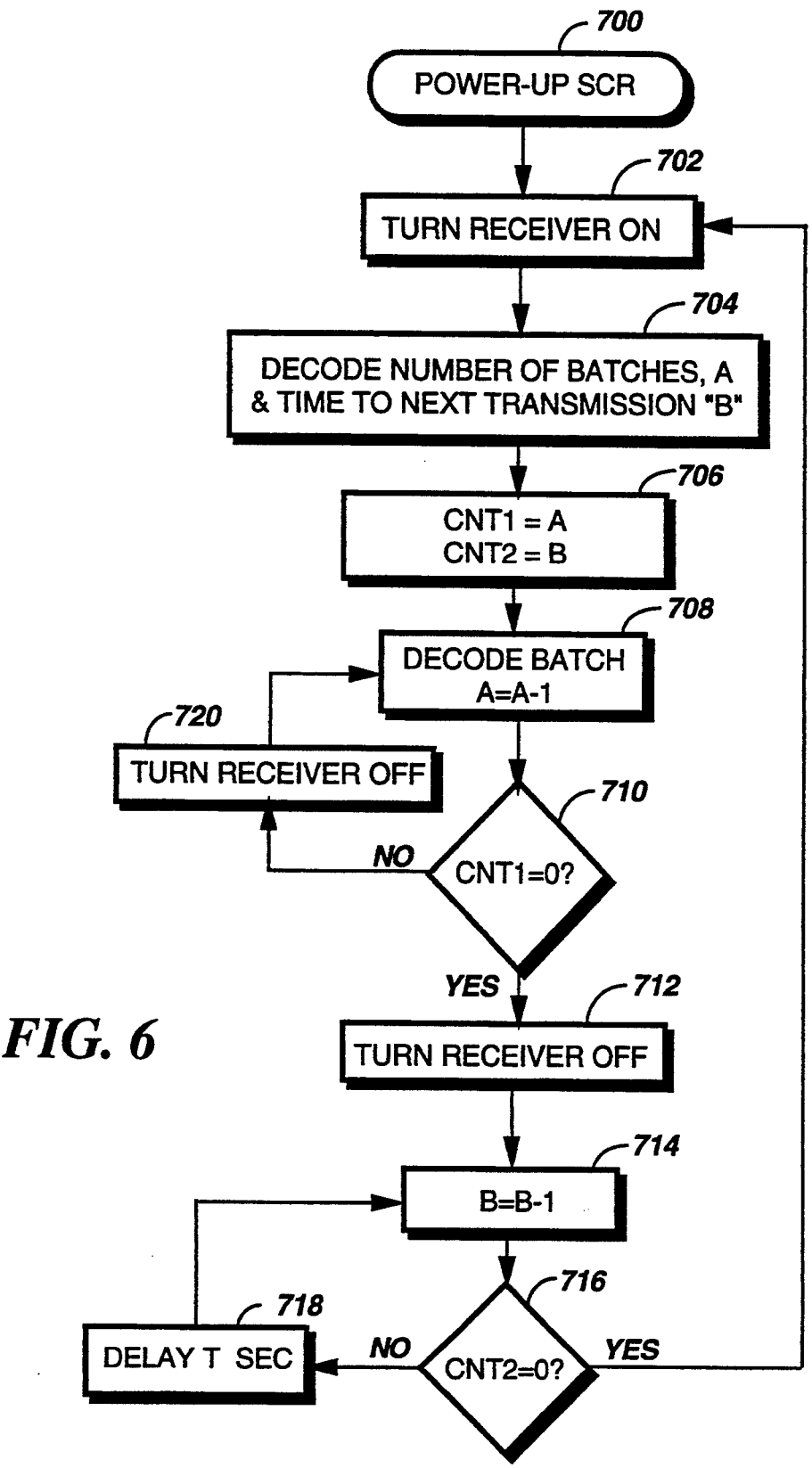
FIG. 6 is flow diagram illustrating the operation of the selective call receiver of FIG. 4 according to the preferred embodiment of the invention.

FIGS. 6 is a flow diagram illustrating the operation of the selective call receiver of FIG. 4. According to the preferred embodiment of the present invention, the selective call receiver powers-up, step 700, and turns-on power to the receiver circuitry for receiving paging signals, step 702. After decoding preamble and synchronization codeword, the selective call receiver decodes the variable system information to determine the number of batches N that are being transmitted in the current paging transmission, and the time to the next paging transmission B, step 704. The microprocessor initialize counters, for example, to count the number of batches N and measure the time B to the next transmission, step 706. Preferably, a counter CNT1 is initialized with the N number of batches, and another counter CNT2 is initialized with the time to the next transmission B. When each assigned frame of the current batch is received, the counter CNT1 is decrement by 1, step 708, and step 710, checks when the counter CNT1 has reached zero. If not, the receiver is turned-off until the arrival of the next assigned frame in the next batch, step 720, that is, the normal or the first battery saving mode is initiated during reception of the N frames of the N batches. The process then returns to step 708 to receive the next frame in the next batch and to decrement the counter CNT1.

However, when counter CNT1 is zero, step 710, the receiver turns-off, 712, and the counter CNT2 is decrement by one, step 714. Step 716 checks when the counter CNT2 has reached zero. If no, the selective call receiver waits a fixed time T and continues to step 714 to decrement counter CNT2. When the counter CNT2 is zero, this corresponds to the expected time of arrival of the first bit of the first synchronization codeword of the next transmission, the process therefore, returns to step 702 to turn-on power to the receiver circuitry. In this way, a paging system that transmits information relating the number of batches N and the time B from the last batch to the next paging transmission extends the battery life of all selective call receivers 200 that are able to decode this information irrespective of which frames are assigned to these selective call receivers. At the end of the time B plus the time from the selective call receiver's assigned frame, a signal is sent by the microcomputer 206 to the power switch 210 which enables power to the receiver 206 for receiving the batches transmitted in a subsequent paging transmission. The selective call receiver therefore operates in its normal (first) battery saving mode while receiving information within the N batches, however, after the Nth frames of the Nth batches has been received, the selective call receiver battery saves in a super (second) battery saving mode until the first synchronization codeword of the next paging transmission is transmitted. This super battery saving mode significantly increases the receiver off-time by reducing the current drain on the battery thereby extending battery life.

We claim:

1. A selective call receiver system including a base site capable of transmitting paging information having a plurality of batches in a paging transmission wherein successive paging transmissions being transmitted within a fixed time period, the base site comprising:

means for counting the plurality of batches to be transmitted in a first of at least two successive paging transmissions and assigning a number thereto;

means, coupled to the means for counting, for calculating a time between an end of the plurality of batches to be transmitted in the first of the at least two paging transmissions to a start of a next successive paging transmission;

base site processing means, coupled to the calculating means and the counting means, for processing the paging information, said base site processing means comprising:

means for encoding a portion of at least the first of the at least two successive paging transmissions with the calculated time and the number to be transmitted in the first paging transmission; and base site transmitting means, coupled to the base site processing means, for transmitting the at least two successive paging transmissions according to the fixed time period to a plurality of selective call receivers; the selective call receivers, comprising:

means for receiving the paging transmissions;

means, coupled to the receiving means, for decoding the number being transmitted therein and the calculated time indicating the time after the transmission of the plurality of batches to the next successive paging transmission; and means, coupled the decoding means, for disabling and enabling a power supply to said receiving means for receiving an assigned frame of the plurality of batches;

said disabling and enabling means, being further responsive to the plurality of batches being decoded, for disabling said power supply to said receiving means for the calculated time until the next successive paging transmission.

2. The selective call receiver system according to claim 1 wherein the encoding means encodes the preamble in alternating one/zero bit pattern at a first bit rate.

3. The selective call receiver system according to claim 1 wherein the base site transmitting means continually transmits paging information, and wherein a predetermined idle pattern is transmitted during a time interval between successive transmissions.

4. The selective call receiver system according to claim 3 wherein the encoding means encodes the paging information at a predetermined baud rate, and encodes a predetermined idle pattern in an alternating one/zero pattern at a baud rate less than the predetermined baud rate of the encoded paging information.

5. The selective call receiver system according to claim 4 wherein the idle pattern baud rate is three hundred bits-per-second for a five-hundred and twelve bits-per-second encoded paging information baud rate.

6. The selective call receiver system according to claim 4 wherein the idle pattern baud rate is seven hundred and fifty bits-per-second for a twelve hundred bits-per-second encoded paging information baud rate.

7. The selective call receiver system according to claim 1 wherein the base site transmitting means terminates transmission during a time interval between transmissions of the at least two successive paging transmissions.

8. A base site capable of transmitting paging information having a plurality of batches in a paging transmission wherein successive paging transmissions being transmitted within a fixed time period, the base site, comprising:

means for counting the plurality of batches to be transmitted in a first of at least a first of the at least two successive paging transmissions and assigning a number thereto;

means, coupled to the means for counting, for calculating a time between an end of the plurality of batches to be transmitted in the first of the at least two paging transmissions to a start of a next successive paging transmission;

means, coupled to the calculating means and the counting means, for processing the paging information, said processing means comprising:

means for encoding a portion of at least the first of the at least two successive paging transmissions with the calculated time and the number being transmitted therein; and transmitting means, coupled to the processing means, for transmitting the at least two successive paging transmission according to the fixed time period to a plurality of selective call receivers.

9. The base site according to claim 8 wherein the encoding means encodes the preamble in alternating one/zero bit pattern at a first bit rate.

10. The base site according to claim 8 wherein the transmitting means continually transmits paging information, and transmit a predetermined idle pattern during a time interval between successive transmissions.

11. The base site according to claim 8 wherein the encoding means encodes the paging information at a predetermined baud rate, and encodes a predetermined idle pattern in an alternating one/zero pattern at a baud rate less than the predetermined baud rate of the encoded paging information.

12. The base site according to claim 11 wherein the transmitting means transmits the idle pattern baud rate at three hundred bits-per-second when transmitting a five hundred and twelve bits-per-second encoded paging information baud rate.

13. The selective call receiver system according to claim 11 wherein the transmitting means transmits the idle pattern baud rate at seven hundred and fifty bits-per-second when transmitting a twelve hundred bits-per-second encoded paging information baud rate.

14. The selective call receiver system according to claim 8 wherein the base site transmitting means terminates transmission during a time interval between transmissions of the at least two successive paging transmissions.

15. A selective call receiver capable of receiving paging transmissions being transmitted within a fixed time period having a plurality of batches, comprising:

means for receiving the paging transmissions;

means, coupled to the receiving means, for decoding a number encoded in the paging transmission indicative of the number of batches being transmitted therein, and a time encoded in said paging transmission indicative of the time from said plurality of batches of said paging transmission to a next paging transmission; and means, coupled to the decoding means, for disabling and enabling a power supply to said receiving means for receiving an assigned frame of the plurality of batches;

said disabling and enabling means, responsive to the plurality of batches being decoded, for disabling said power supply to said receiving means during the time from said plurality of batches to the next successive paging transmission.

16. The selective call receiver according to claim 15 wherein the receiving means is capable of receiving a first and second paging transmissions at a first and second baud rates.

17. In a selective call receiver system including a base site capable of transmitting paging information having a plurality of batches in a paging transmission wherein successive paging transmissions being transmitted within a fixed time period, a method comprising the steps of:
  (a) counting the plurality of batches to be transmitted in a first of at least two successive paging transmissions and assigning a number thereto;
  (b) calculating a time between an end of the plurality of batches to be transmitted in the first of the at least two paging transmissions to a start of a next successive paging transmission;
  (c) processing the paging information, said step of processing further comprising the steps of:
  (d) encoding a portion of the first of the at least two successive paging transmissions with the calculated time and the number to be transmitted in the first paging transmission; and
  (e) transmitting the at least two successive paging transmissions according to the calculated time to a plurality of selective call receivers; said selective call receiver further comprising the steps of:
  (f) receiving the paging transmissions;
  (g) decoding the number being transmitted therein and the calculated time indicating the time after the transmission of the plurality of batches to the next successive paging transmission; and
  (h) disabling and enabling a power supply to said receiving means for receiving an assigned frame of the plurality of batches wherein said step of disabling and enabling disables the power supply for the calculated time until the next successive paging transmission.

18. In a base site capable of transmitting paging information having a plurality of batches in a paging transmission wherein successive paging transmissions being transmitted within a fixed time period, a method comprising the steps of:
  (a) counting the plurality of batches to be transmitted in at least a first of the at least two successive paging transmissions;
  (b) calculating a time between an end of the plurality of batches to be transmitted in the first of the at least two paging transmissions to a start of a next successive paging transmission;
  (c) processing the paging information, said step of processing further comprising the steps of:
  (d) encoding a portion of at least a first of the at least two successive paging transmissions with the calculated time and the number being transmitted therein; and
  (e) transmitting the at least two successive paging transmission according to the fixed time period to a plurality of selective call receivers.

19. In a selective call receiver capable of receiving paging transmissions being transmitted within a fixed time period having a plurality of batches, a method comprising the steps of:
  (a) receiving the paging transmissions;
  (b) decoding a number encoded in the paging transmission indicative of the number of batches being transmitted therein, and a time encoded in said paging transmission indicative of the time from said plurality of batches of said paging transmission to a next paging transmission; and
  (c) disabling and enabling a power supply to said receiving means for receiving an assigned frame of the plurality of batches, said step of disabling and enabling disables the power supply to the receiving means during the time from said plurality of batches to the next successive paging transmission.

20. A selective call receiver system including a base site capable of transmitting paging information having a plurality of batches and an idle signal, the base site comprising:
  a timer for calculating a time between two successive transmissions of the paging information;
  a counter for counting a number of batches to be transmitted in a first of the two successive paging transmissions;
  a base site processor, coupled to the timer and the counter, for processing the batches of paging information, said base site processor comprising:
  means for organizing the paging information in the plurality of batches of the paging transmissions; and
  an encoder for encoding a portion of the at least first of the at least two successive paging transmissions with the calculated time between the two successive paging transmissions an, d the number of batches to be transmitted in the first paging transmission; and
  a base site transmitter, coupled to the base site processor, for transmitting the two successive paging transmissions according to the calculated time to a plurality of selective call receivers, said base site transmitter transmits the two successive paging transmissions at a first baud rate and an idle signal at a second baud rate lower than the first baud rate of the two successive paging transmissions; at least one of the plurality of selective call receivers capable of receiving the paging transmissions at the first and second baud rate, said selective call receiver comprising:
  a receiver for receiving the paging transmissions;
  a decoder, coupled to the receiver, for decoding the batches of paging information of the received paging transmissions;
  a controller, responsive to the decoder, for processing the batches of paging information, said controller being able to determine the number of batches being transmitted and the calculated time to a next paging transmission, and
  power switch, coupled the decoder, for disabling and enabling a power supply to said receiver for receiving an assigned frame of the plurality of batches;
  said power switch, being further responsive to the plurality of batches being decoded, for disabling the receiving means during transmission of the idle signal, and enabling said power supply to said receiver for receiving successive paging transmissions.

* * * * *

UNITED STATES PATENT AND TRADEMARK OFFICE
CERTIFICATE OF CORRECTION

PATENT NO. : 5,382,949
DATED : January 17, 1995
INVENTOR(S) : Von A. Mock

It is certified that error appears in the above-indentified patent and that said Letters Patent is hereby corrected as shown below:

Column 12, line 32, change "an, d" to --and --.

Signed and Sealed this

Twenty-first Day of November, 1995

Attest:

BRUCE LEHMAN

*Attesting Officer*  *Commissioner of Patents and Trademarks*